July 3, 1945. T. G. MYERS 2,379,648
SEALED SUBMERSIBLE STRUCTURE
Original Filed Nov. 22, 1937 2 Sheets-Sheet 1

INVENTOR
Thomas G. Myers
BY John Flam
ATTORNEY

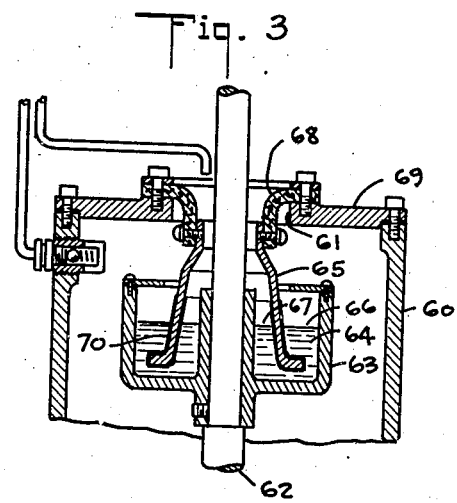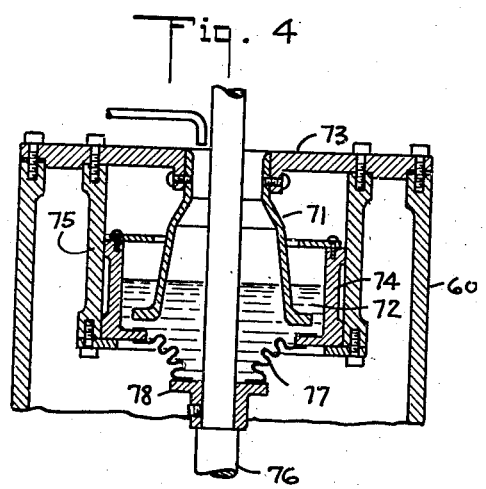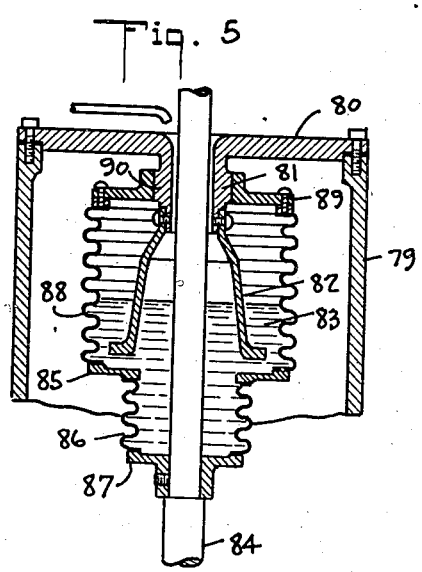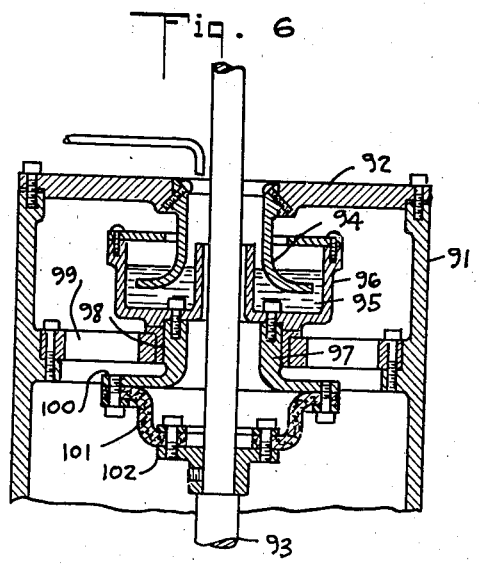

Patented July 3, 1945

2,379,648

UNITED STATES PATENT OFFICE 2,379,648

SEALED SUBMERSIBLE STRUCTURE

Thomas G. Myers, Los Angeles, Calif., assignor to U. S. Electrical Motors, Inc., Los Angeles, Calif., a corporation of California Original application November 22, 1937, Serial No. 175,896, now Patent No. 2,309,707, dated February 2, 1943. Divided and this application April 21, 1942, Serial No. 439,813

11 Claims. (Cl. 286—9)

This invention relates to submersible structures, such as electrical motors that are adapted to operate in a well, for driving a pump therein. This application is a division of an application filed in the name of Thomas G. Myers on November 22, 1937, under Serial No. 175,896, and entitled "Sealed submersible structure," now Patent No. 2,309,707, issued February 2, 1943.

The problems met with in such installations have been described in a prior application filed in the name of Thomas G. Myers on November 8, 1937, under Serial Number 173,434, and entitled "Submersible structure," now Patent No. 2,318,181, issued May 4, 1943..

In general such submersible structures utilize a casing in which the motor parts are enclosed. The well liquid is excluded at least from that part of the casing in which the motor windings and the rotary structures are located. As it is essential that the motor shaft extend out of the casing for connection to the pump, a seal must be provided around the shaft to exclude passage of well liquid into the casing along the cylindrical shaft surface.

In the prior applications heretofore referred to, several forms of such seals are described, in which there is utilized a heavy liquid, such as mercury, to overlie relatively rotary sealing surfaces, and thereby to operate as a supplemental seal.

It is one of the objects of this invention to provide a sealing structure in which the sealing liquid and the sealing surfaces are so arranged that the seal remains undisturbed even upon material misalinement or transverse motion of the shaft.

In this connection, it is another object of the invention to provide a simple and effective device for permitting at least limited freedom of flexure or motion of the shaft without detriment to other parts of the mechanism; and that will maintain the seal intact even upon vibration of the shaft, due to any cause, such as wear.

These objects are attained in general by the provision of a cup disposed around the shaft and carrying the sealing liquid, into which extends a sleeve, also disposed around the shaft, the cup and sleeve forming relatively rotatable elements. To prevent vibrating motion, or "whipping" of the shaft from being imparted to the sealing liquid, and impairing the sealing effect between the sealing liquid and the sealing elements, means are provided to prevent relative lateral movement or vibration of the cup and with respect to the sleeve, at the same time allowing freedom of lateral movement of the shaft. This is accomplished in this invention by providing yielding or comfortable supports of fabric or the like, diaphragms, or metal bellows, for the sealing elements.

This invention possesses many other advantages, and has other objects which may be made more easily apparent from a consideration of several embodiments of the invention. For this purpose there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Figs. 3 to 8 inclusive are views similar to Fig. 2, but showing further modifications of the invention.

Figure 1:
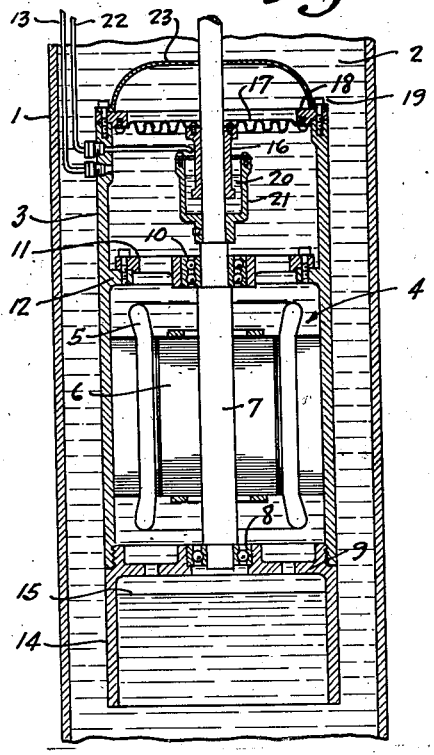
Figure 1 is a view, mainly in section, of a submersible structure embodying the invention and immersed in a well.

In Fig. 1 there is shown a well having the well casing 1, and shown as having disposed within it the well liquid 2. This well liquid is usually water.

A submersible structure, including the casing 3, is intended to be submerged in the well liquid. This submersible structure is shown in the present instance as including a squirrel cage induction motor 4 having primary windings 5, a rotor 6, and a shaft 7. The shaft 7 is shown in this instance as projecting upwardly out of the casing 3 for direct connection to a pump (not shown) for pumping the well liquid 2 out of the well.

The shaft 7 is intended to be rotatably supported by appropriate bearing structures located within the casing 3. This casing is so arranged that well liquid is excluded from all rotary parts and from the windings of the motor. The manner in which this is accomplished will be described hereinafter.

The support for the shaft 7 may include a thrust ball bearing structure 8 supported in an apertured wall 9 extending across the bottom of the casing 3. Adjacent the upper end of the casing the ball bearing structure 10 may be provided for the shaft; the bearing is supported as by a spider 11 fastened to the flange 12, shown as formed integrally with the casing 3.

This part of the casing 3 which houses the motor 4 and the bearing structures 8 and 10, is intended to be filled with a neutral liquid or lubricant, such as oil, or with air. For example, an oil or air supply pipe line 13 may connect the interior of the casing 3 with a source of liquid or gas at the top of the well. Provisions may be added, if desired, to prevent reverse flow of the filling from the casing through the pipe 13.

Ordinarily it is preferable to maintain the fluid pressures within and outside of the casing 3 at substantially equal values, or to maintain the pressure within the casing 3 slightly higher than the external pressure of the well liquid 2. This pressure equalization may be provided by any appropriate pressure balancing means operating upon the source of supply for the casing filling. However, in the present instance, as representative of means for securing this pressure balance, use is made of a depending open portion 14 of the casing 3. Within this portion the well liquid is intended to rise, its upper level 15 being intended at all times to be substantially below the lowermost bearing structure 8. The surface of contact 15 with the casing filling serves to transmit well pressure to the interior of the casing 3.

It is obvious that the well liquid 2 must be excluded from entering the casing 3 around the shaft 7 where it emerges from the casing 3. For this purpose use is made of a sealing device which includes an elongated non-rotary sealing member or bushing 16. This bushing 16 is shown as directly contacting the cylindrical surface of the shaft 7 where it extends from the casing 3. This contact is purposely made very close, the tolerance between member 16 and shaft 7 being one-half of one one-thousandth of an inch or less. Accordingly there is a material resistance to the flow of liquid through the very narrow passage formed between the closely fitting sleeve 16 and shaft 7.

The sleeve 16 must be supported by the casing 3. In the present instance this supporting means includes a flexible corrugated diaphragm 17 which extends across the top of the casing 3 and forms an upper fluid tight wall thereon. For this purpose this diaphragm 17 is provided with an annular rim 18, fastened as by bolts 19 to the upper edge of the casing body. The corrugations in the diaphragm 17 make this diaphragm sufficiently yielding or flexible for a purpose to be later described. This diaphragm may be made of any appropriate material capable of withstanding the mechanical stresses imposed thereon, although suitable metal of acceptable durability is preferred.

The flexible member 17 serves an important purpose in conjunction with the close fit between the shaft 7 and the sleeve 16. As the shaft 7 is placed under load, it is very apt to be whipped or vibrated out of alignment with the true vertical axis of the casing 3. Were it not for the diaphragm 17, this whipping would cause harmful vibration of the entire mechanism, and a tendency to destroy the seal. The misalignment is permitted by the flexing of diaphragm 17 without any danger of the transmission of harmful vibrations to other parts of the mechanism, and without disturbing the proper axial alignment between shaft 7 and sleeve 16.

Although in some instances the seal provided by the closely contacting member 16 is sufficient, yet it is preferred to supplement this seal by utilizing a heavy sealing liquid 20, into which the lower end of member 16 extends. This sealing liquid 20 may be mercury, carbon tetrachloride, carbon disulphide, or the like, and may be accommodated in a rotary cup 21 carried by the shaft 7. A filler pipe 22 is indicated as leading upwardly to a source of supply for the sealing liquid. In this way the sealing liquid can be replenished whenever desired, from the top of the well.

The diaphragm 17 also serves to some extent as a pressure balancing medium from the inside to the outside of the casing 3. Its main function, however, is to permit misalignment of the shaft 17, as heretofore stated, without disturbing the seal, and without transmitting harmful vibrations to other parts of the apparatus.

In order generally to exclude sand that may be suspended in the well liquid 2, from around the top of shaft 7, a supplemental guard flange 23 is indicated. This may be held as by bolts 19 over the diaphragm 17.

The liquid seal 20 overlying the lower end of the non-rotary member 16, serves as a supplemental seal. Well liquid, in order to enter the casing 3, must not only pass between shaft 7 and member 16, but must also pass through the sealing liquid 20. Since this sealing liquid has considerable surface tension, it cannot escape through the extremely narrow passage formed between the two contacting members 7 and 16.

It is not essential that the filling of the submersible casing be limited to a neutral liquid, such as oil, that is lighter than well liquid. The neutral liquid may be carbon tetrachloride, which is heavier than the well liquid and which is inert.

Figure 2:
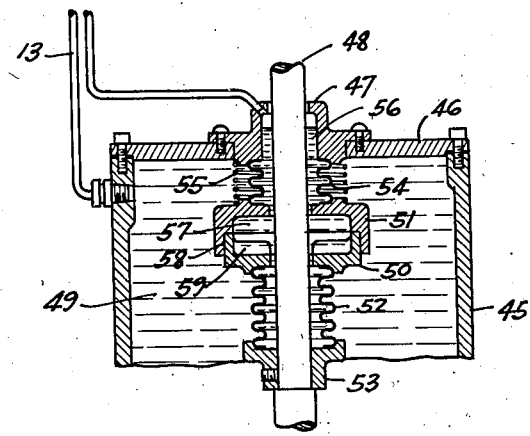
Fig. 2 is a fragmentary sectional view illustrating a modified form of seal that may be used in place of the seal shown in Fig. 1.

Such a form of the invention is illustrated in Fig. 2. In this form, the submersible casing 45 is shown as having an upper flange or cover 46 provided with a clearance aperture 47 for the passage of the rotary shaft 48. The filling 49 for this casing 45 is intended to be carbon tetrachloride.

In addition, a somewhat different form of seal is illustrated. In this form there are two relatively rotary members in telescopic relation. These members are respectively, the rotary member 50, shown in this instance as telescoping within the non-rotary member 51. These two members are respectively supported by yielding supports. Thus for example, the rotary member 50 is shown as supported by the metal bellows 52, in turn supported on the shaft 48, as by the aid of the collar 53. The non-rotary member 51 is likewise shown as supported by the metal bellows 54, joined to the top member 46. A compression spring 55 may, if desired, be utilized to urge the two members 50 and 51 together in telescopic relation.

These two members, furthermore, define with the shaft 48 an annular space around this shaft which may be filled with heavy sealing liquid 56, preferably carbon tetrachloride or carbon disulphide. This sealing liquid serves as a seal against the entry of well liquid into the hollow space 57 defined by the members 50 and 51 and past the cylindrical sealing surface 58.

It is apparent that the carbon tetrachloride 56 is in contact with well liquid at the top of the casing 45. This well liquid may emulsify or mix with the sealing liquid and thereby destroy, to some extent, the sealing effect of this body of liquid. In order to prevent emulsification and to separate the carbon tetrachloride in case any emulsification should happen, a centrifugal separator is provided. This is most conveniently formed by the aid of the generally radial ribs or fins 59, shown as formed integral with the bottom of the rotary cup 50. These fins 59 serve to direct the heavy liquid 56 outwardly. There is thus a centrifugal separating action urging the liquid continually against the relatively rotary sealing surfaces. Material emulsification is thus prevented, and the seal is also improved.

In the form of the invention illustrated in Fig. 3, the submersible casing 60 is shown as having an aperture 61 at the top, through which the rotary shaft 62 extends. In order to seal the entry of well liquid through this aperture 61, use is made of a rotary cup 63, carried by the shaft 62, and enclosing a heavy sealing liquid 64, which may be any of the liquids heretofore mentioned. Extending within this liquid 64 is a non-rotary member 65 which serves to separate the upper surface of the liquid 64 into an outer portion 66 and an inner portion 67, respectively, in communication with the neutral liquid filling in casing 60 and with the well liquid.

For this purpose, the member 65 is supported in fluid tight manner by the casing 60. In this form of the invention, this support is provided by a collar 68, which is made of conformable or flexible metal or fabric appropriately treated to withstand the action of the liquids with which it is in contact. This collar is provided with a flange for fastening it directly to the top wall 69 of casing 60.

It is apparent that should the shaft 62 vibrate, due to worn bearings or under load, this vibration would be imparted to the body of mercury or heavy liquid 64. This in turn would produce harmful vibrations upon other parts of the apparatus and upon the member 65. However, by supporting member 65 upon the flexible member 68, these vibrations are rendered harmless.

In case mercury be utilized for the sealing liquid 64, it is preferable to render the surface in contact with this mercury, inert with respect to it. This may be accomplished by appropriate choice of the materials for the cup 63 and the member 65. For example, Bakelite might be used for the cup 63, or some other material similar thereto, which has no affinity for mercury. Alternatively, an inert layer, such as ceramic enamel may be applied over the contacting surfaces of these parts. Such a layer 70 is indicated as disposed on the member 65.

In the form of the invention illustrated in Fig. 4, the casing 60 is constructed similarly to the casing shown in Fig. 3. In this instance the member 71, which segregates the upper level of the sealing liquid 72 into two parts, is shown as rigidly attached within the central aperture formed in the cover 73. The rotary cup 74, in which the liquid seal 72 is accommodated, is shown as guided to maintain it directly axial with respect to the casing axis, as by aid of the stationary bearing member 75. This bearing member centers the cup 74 at all times.

In order to permit deviation of the shaft 76 from truly axial position, without causing the cup 74 to be misaligned, the cup 74 is flexibly supported by the aid of the shaft 76. This may be accomplished by the aid of the metal bellows 77, joined to the collar 78, carried by the shaft 76. In this way, whipping or vibration of the shaft 76 will not impart vibration to the rotating mercury 72.

As before, the surfaces of the parts immersed in, or in contact with, the mercury 72 may be treated appropriately to prevent chemical deterioration or reaction.

The manner in which the rotary mercury cup is guided to prevent the transmission of vibrations from the shaft to the mercury, may be varied. Thus for instance, in Fig. 5 the submersible casing 79 is shown as having a fluid tight top cover 80, having an inwardly directed boss 81. The lower end of this boss 81 carries the non-rotary member 82 which divides the top surface of the mercury sealing liquid 83 as before. The shaft 84 has a clearance with the aperture in the central boss 81, whereby the well liquid may be in contact with the inner annular portion of the mercury surface 83.

The mercury cup in this instance is shown as formed of a metal bellows 88 fastened to a flange 85. The inner edge of this flange 85 is shown as connected to a supplemental metal bellows 86 fastened to the collar 87, carried by the shaft 84.

As in the previous forms of the invention, the yielding connection 86 in the form of the metal bellows, permits vibration of the shaft 84, although the axis of the cup may be maintained fixed with respect to casing 79. In order to guide the cup rotation in this manner, the cup is shown as having an upper cover 89, having a central aperture bearing upon the bearing sleeve 90, fastened to the boss 81.

Another form of guide for the rotary cup is illustrated in Fig. 6. In this form of the invention, the submersible casing 91 is provided with a cover 92 through which the shaft 93 passes. The cover 92 supports the non-rotary member 94 for segregating the top surface of the sealing liquid 95 into two parts, respectively in contact with the well liquid and the inert filling in the casing 91.

In this instance, the heavy sealing liquid is shown as accommodated in the rotary cup 96. This rotary cup 96 is fastened to the top of a guide member 97, having a bearing 98 within a spider 99 fastened to the inside of the casing 91. This guide member 97 is furthermore provided with a flange 100 connected so as to be driven by shaft 93, as by the aid of the flexible member 101 that is attached to the collar 102, carried by the shaft 93. The flexible member 101 is fluid tight, and is made from appropriately treated fabric or felt or the like. In this instance it is preferred to fill casing 91 with an inert liquid that is somewhat heavier than the well liquid. This may be carbon tetrachloride or carbon disulphide.

Figure 7:
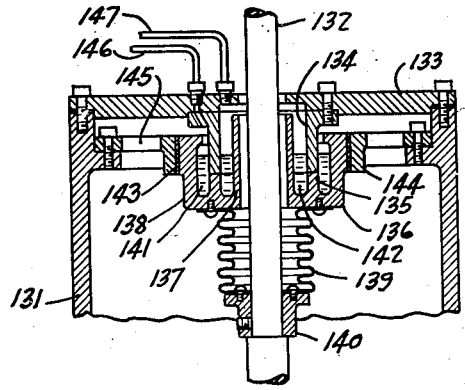

In the form of the invention illustrated in Fig. 7, the submersible casing 131 is shown as having a rotary shaft 132 extending upwardly therefrom. The casing 131 may be provided with any of the usual pressure balancing devices, and with a filling of oil or the like. The provision of a seal around the shaft 132 is accomplished by the aid of non-rotary and rotary members having sealing surfaces in contact with each other.

Thus for example, the top 133 of the casing 131 may support an annular non-rotary sealing member 134. The lower edge of this sealing member 134 is shown as in contact with the intermediate flange 135 of a rotary cup 136. This rotary cup is shown as having an inner flange 137 and an outer flange 138, forming a pair of separated annular chambers. The rotary cup 136 is yieldingly supported on shaft 132, as by the aid of the metal bellows 139 supported on collar 140, fastened to shaft 132.

A body of sealing liquid 141 extends in the outer annular space of the cup and overlaps the area of sealing contact. Another body of sealing liquid 142 is similarly disposed in the inner annular space and overlaps the area of contact. In order to prevent deterioration of the parts in contact with the mercury, appropriate protective measures may be taken as suggested heretofore, such for example, as the provision of enamel surfaces, or the use of materials or coatings which do not amalgamate, affect or combine with mercury.

In order to permit the shaft 132 to vibrate without harmfully affecting the seal or other parts of the apparatus, the bellows 139 for supporting cup 136 is provided. The rotary cup 136, however, is guided to have a fixed axis with respect to the casing 131, and thereby to prevent the mercury from being unduly vibrated. For this purpose the sealing sleeve 143 is provided, co-acting with the outer cylindrical surface of the cup. This bearing sleeve 143 is supported in the boss 144 integral with the spider 145. Filling tubes 146 and 147 may be provided for replenishing the sealing liquids 141 and 142 respectively.

Of course, the sealing surfaces should be such as to prevent a thin film of mercury or its amalgam to creep through these surfaces, or otherwise to deteriorate the materials.

In the forms of the invention such as shown in Figs. 2 and 7, utilizing metal bellows, spring means supplementing liquid pressure may be utilized to urge the sealing surfaces into contact with each other. Such a spring means is indicated at 55 in the form of the invention illustrated in Fig. 2. Ordinarily, however, the areas of the sealing members exposed to the liquid pressure within the casing can be so chosen as to provide a sufficient pressure to hold the parts in proper sealing relationship.

Figure 8:
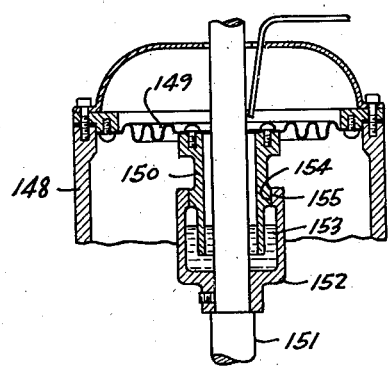

In Fig. 8 a further modification is shown, in which the motor casing 148 supports a flexible diaphragm 149, closing its upper end. A sleeve or tubular member 150 is attached to the diaphragm and extends downwardly along shaft 151 into a rotating cup 152 secured to the shaft. In this case, however, a substantial space is provided between the sleeve and the shaft. A heavy sealing liquid 153 as in the other forms is disposed in the cup. Sleeve 150 extends into the sealing liquid, and as the bore of this member is larger than the shaft, the surface of the sealing liquid is divided into two parts, the inner of which is in contact with the well liquid, the outer being in contact with the casing filling. To prevent relative lateral motion between the cup and the sleeve, with accompanying disturbance of the sealing liquid, as due to whip of the shaft, or wear of the shaft bearings, cooperating bearing surfaces 154 and 155 are provided on the sleeve and cup respectively. These serve to maintain the sleeve and cup coaxial at all times, since the sleeve, being supported on the flexible diaphragm, is free to move with the cup.

What is claimed is:

1. In a structure adapted to be submerged in well liquid, a casing, a shaft extending out of the casing, a rotary cup carried by the shaft, sealing liquid in the cup, a stationary member carried by the casing and surrounding the shaft, said member extending below the surface of the sealing liquid and forming with the sealing liquid a seal spaced from the shaft, and non-rotary means co-operating with the cup to prevent relative lateral movement between the cup and the member.

2. In a structure adapted to be submerged in well liquid, a casing, a shaft extending out of the casing, a rotary cup carried by the shaft, sealing liquid in the cup, a stationary member carried by the casing and surrounding the shaft, said member extending into the sealing liquid and forming therewith a seal, and non-rotary means co-operating with the cup to maintain the member and the cup coaxial.

3. In a structure adapted to be submerged in well liquid, a casing and a shaft forming relatively rotatable elements, said shaft extending from the casing through an opening permitting substantially transverse movement of the shaft, a rotary cup member, means mounting said cup on said shaft; a heavy sealing liquid in the cup, a non-rotary member surrounding the shaft, and having a lower edge immersed in the sealing liquid so as to cause only a portion of the surface of the sealing liquid to be in contact with the well liquid, and means mounting said non-rotary member on the casing, one of said mounting means being yielding and supporting the mounted member in spaced relation to the element on which the member is mounted to permit transverse displacement of the member with respect to said element.

4. In a structure adapted to be submerged in well liquid, a casing and a shaft forming relatively rotatable elements, said shaft extending from the casing through an opening permitting substantially transverse movement of the shaft, a rotary cup member, means mounting said cup on said shaft, a heavy sealing liquid in the cup, a non-rotary member surrounding the shaft, and having a lower edge immersed in the sealing liquid so as to cause only a portion of the surface of the sealing liquid to be in contact with the well liquid, means mounting said non-rotary member on the casing, one of said mounting means being yielding and supporting the mounted member in spaced relation to the element on which the member is mounted to permit transverse displacement of the member with respect to said element, and guide means for maintaining said members coaxial.

5. In a submersible structure adapted to be submerged in well liquid, a casing, a shaft extending from the casing through an opening permitting substantial transverse movement of the shaft, a rotary cup carried by the shaft, a heavy sealing liquid in the cup, a non-rotary member surrounding the shaft and having a lower edge adapted to be immersed in the sealing liquid so as to cause only a portion of the surface of the sealing liquid to be in contact with the well liquid, and yielding means for supporting the non-rotary member from the casing in spaced relation therewith, to permit said member to move in a direction transverse to the shaft.

6. In a structure adapted to be submerged in well liquid, a casing, a shaft extending out of the casing, a rotary cup, sealing liquid in the cup, means co-operating with the liquid to form a seal around the shaft, and means to ensure that said cup will rotate about an axis fixed with respect to the casing, comprising a yielding member supported by the shaft, and secured to the cup, means carried by the cup forming a cylindrical surface, and means forming a stationary guide for said surface.

7. In a submersible structure adapted to be submerged in well liquid, a casing, a shaft extending from the casing, a rotary cup, a yielding support for the cup and adapted to be supported on the shaft, a non-rotary guide means for the cup to maintain the cup rotation about an axis irrespective of deviations of the shaft from that axis, and a sealing liquid in the cup.

8. In a submersible structure adapted to be submerged in well liquid, a casing, a shaft extending from the casing, a rotary cup, a yielding support for the cup and adapted to be supported on the shaft, a non-rotary guide means for the cup to maintain the cup rotation about an axis irrespective of deviations of the shaft from that axis, a sealing liquid in the cup, and a non-rotary member surrounding the shaft and having a lower edge adapted to be immersed in the sealing liquid, and supported by the casing.

9. In a submersible structure adapted to be immersed in well liquid, a casing, a shaft extending from the casing, a rotary cup structure carried by the shaft, said cup structure including a yielding member joining it to the shaft, as well as a cup proper also formed of yielding material, and an apertured cover for the cup; means supported by the casing and cooperating with the aperture in the cover for causing the cup structure to rotate on a fixed axis irrespective of deviations of the shaft therefrom, and a sealing liquid in the cup.

10. In a submersible structure adapted to be submerged in well liquid, a casing, a shaft extending from the casing, a rotary cup carried by the shaft, a heavy sealing liquid in the cup, a non-rotary member surrounding the shaft and having a lower edge adapted to be immersed in the sealing liquid so as to cause only a portion of the level of the sealing liquid to be in contact with the well liquid, said rotary cup having a cylindrical area of contact with the non-rotary member, said cylindrical area of contact being coaxial with the shaft, and yielding means for supporting the non-rotary member from the casing.

11. In a submersible structure adapted to be submerged in well liquid, a casing, a shaft extending from the casing through an opening permitting substantial transverse movement of the shaft, a non-rotating tubular member surrounding the shaft and forming an annular space open to well liquid, yielding means for supporting the tubular member from the casing in spaced relation therewith, said means permitting said member to move with respect to the casing in a direction transverse to the shaft, a rotary cup carried by the shaft, a heavy sealing liquid in the cup, the lower end of said tubular member being immersed in the sealing liquid whereby a portion of the level of the sealing liquid is in contact with the well liquid, and means for maintaining said tubular member coaxial with the shaft.

THOMAS G. MYERS.